(12) United States Patent
Brett

(10) Patent No.: US 6,704,045 B1
(45) Date of Patent: Mar. 9, 2004

(54) METHOD OF AUTOMATICALLY IDENTIFYING AND MODIFYING THE APPEARANCE OF AN OBJECT IN SUCCESSIVE FRAMES OF A VIDEO SEQUENCE

(75) Inventor: Stephen Brett, Sutton-at-Home (GB)

(73) Assignee: Pandora International Ltd., Northfleet (GB)

( * ) Notice: Subject to any disclaimer, the term of this patent is extended or adjusted under 35 U.S.C. 154(b) by 0 days.

(21) Appl. No.: 08/928,282

(22) Filed: Sep. 12, 1997

(30) Foreign Application Priority Data

Sep. 12, 1996 (GB) .............................................. 9619117

(51) Int. Cl.$^7$ .............................................. H04N 5/228
(52) U.S. Cl. ..................................... 348/222.1; 348/97
(58) Field of Search .............................. 348/223, 229, 348/256, 598, 599, 97, 96, 576, 577, 34, 221, 700, 701; 382/256, 162, 167; 358/505, 506, 518, 519, 520, 521

(56) References Cited

U.S. PATENT DOCUMENTS

| | | | | |
|---|---|---|---|---|
| 3,769,598 A | * | 10/1973 | Schauffele et al. ..... | 250/301.19 |
| 3,772,465 A | * | 11/1973 | Vlahos et al. ............... | 348/576 |
| 4,642,682 A | * | 2/1987 | Orsburn et al. ............. | 348/520 |
| 4,694,329 A | * | 9/1987 | Belmares-Sarabia et al. .............. | 348/577 |
| 4,755,870 A | * | 7/1988 | Markle et al. ................. | 348/34 |
| 4,782,384 A | | 11/1988 | Tucker et al. | |
| 4,823,184 A | * | 4/1989 | Belmares-Sarabia et al. .............. | 348/650 |
| 4,984,072 A | * | 1/1991 | Sandrew ...................... | 348/34 |
| 5,093,717 A | * | 3/1992 | Sandrew ...................... | 348/34 |
| 5,260,787 A | * | 11/1993 | Capitant et al. ............. | 348/459 |
| 5,430,809 A | * | 7/1995 | Tomitaka ..................... | 382/173 |
| 5,459,517 A | * | 10/1995 | Kunitake et al. ....... | 375/240.13 |
| 5,565,998 A | * | 10/1996 | Coombs et al. ............... | 348/96 |
| 5,731,846 A | * | 3/1998 | Kreitman et al. ........... | 348/599 |
| 5,767,922 A | * | 6/1998 | Zabih et al. ................. | 348/700 |
| 5,874,988 A | * | 2/1999 | Gu .............................. | 348/97 |
| 5,912,980 A | * | 6/1999 | Hunke ........................ | 382/103 |
| 5,930,445 A | * | 7/1999 | Peters et al. ................... | 348/97 |
| 6,049,363 A | * | 4/2000 | Courtney et al. ........... | 348/700 |
| 6,055,025 A | * | 4/2000 | Shahraray ................... | 348/700 |

FOREIGN PATENT DOCUMENTS

| | | |
|---|---|---|
| DE | 33 10949 A1 | 9/1984 |
| DE | 0 555 873 A2 | 8/1993 |
| DE | 0 615 245 A2 | 9/1994 |
| GB | 2 297 217 A | 7/1996 |

OTHER PUBLICATIONS

Search Report in United Kingdom Patent Application No. GB 9719368.4, dated Nov. 14, 1997.
English abstract from online database for DE 33 10949 A1.

* cited by examiner

*Primary Examiner*—Tuan Ho
(74) *Attorney, Agent, or Firm*—McDonnell Boehnen Hulbert & Berghoff

(57) ABSTRACT

The invention provides a method of digitally processing a sequence of video frames, in which an object is selected in a first frame; digital object data corresponding to the shape of the object is stored on a digital data storage mechanism, together with digital modification data corresponding to a desired modification of at least one appearance attribute of the object; the object is identified in a second frame of the sequence by means of the object data; and the appearance attribute of the object in the second frame is modified in accordance with the stored modification data. The invention also provides a method of analysing a sequence of video frames, in which a plurality of corresponding lines are sampled from a plurality of consecutive frames of the sequence; the content of the sampled lines is compared for corresponding lines in different frames; a measure of the difference in the content of the corresponding lines is calculated; a first signal is produced if the measure of difference exceeds a first predetermined threshold; and a second signal is produced, in the absence of the first signal, if the measure of difference exceeds a second predetermined threshold, lower than the first threshold.

9 Claims, 2 Drawing Sheets

METHOD OF AUTOMATICALLY IDENTIFYING AND MODIFYING THE APPEARANCE OF AN OBJECT IN SUCCESSIVE FRAMES OF A VIDEO SEQUENCE

CROSS-REFERENCE TO RELATED APPLICATIONS

This application claims priority to Great Britain application number 9619117.6, filed Sep. 12, 1996.

BACKGROUND

1. Field of the Invention

The present invention relates to digital image processing and is of particular applicability to the processing, for example colour correction, of images during transfer from cinematographic film to videotape by means of a telecine machine.

2. Description of Related Art

Telecine machines scan cinematographic film, and derive electrical signals therefrom corresponding to the images on the film for recording onto videotape or broadcasting as television pictures. One such example of this is the 'URSA' telecine, manufactured by Rank Cintel Ltd. in Ware, England.

It is known to have a so-called grading mode for these telecines, wherein scenes are studied, and a colour correction data set is visually determined for a particular scene. The process of building up a series of colour correction values for a number of scenes, which is then used in a real time 'transfer' mode is taught in U.S. Pat. No. 4,096,523. A telecine controller and programmer which may be used in such a system is the 'POGLE' from Pandora International Ltd.

Although telecine systems as described above often contain the facilities to alter the reproduced colour of the pictures produced on videotape or television broadcast, these facilities are usually limited in their selectivity. The Rank Cintel URSA, for example, has the ability to correct either in a primary or secondary mode. In the primary mode, the overall redness, for example, of the entire image may be increased. In this case, all colours and greys that contain red will be reproduced with a higher red content. In the secondary mode, the system initially distinguishes between greys and colours; greys are left unchanged, whilst colours are arranged into one of six types, each of which can be modified independently.

If it is required to process colours more selectively (for example to modify light reds without altering dark reds) it is necessary to use a more sophisticated colour corrector. One such system is the 'Digital Colour Processor' (DCP) manufactured by Pandora International Ltd., of Northfleet, Kent. Such a system is described in UK patent application No. 2278514 and others.

International patent application WO 95/12289 describes a method of colour correcting a single object in an image. According to this document, an object is selected in a first frame by an operator and the position, shape and an appearance attribute, such as colour or texture, of the object are stored. A modification to the appearance attributes of the object is also stored. The position, shape and an appearance attribute of the object in a subsequent, second frame are also stored. The modification of the appearance attributes of the object in the frames between the first and second frames is effected by interpolating between the two positions and shapes to calculate an expected position and approximate shape of the object in the intermediate frames. The pixels within the approximate shape at the expected position and having the selected appearance attribute of the object are then modified in each of the intermediate frames.

DETAILED DESCRIPTION

Figure 1:
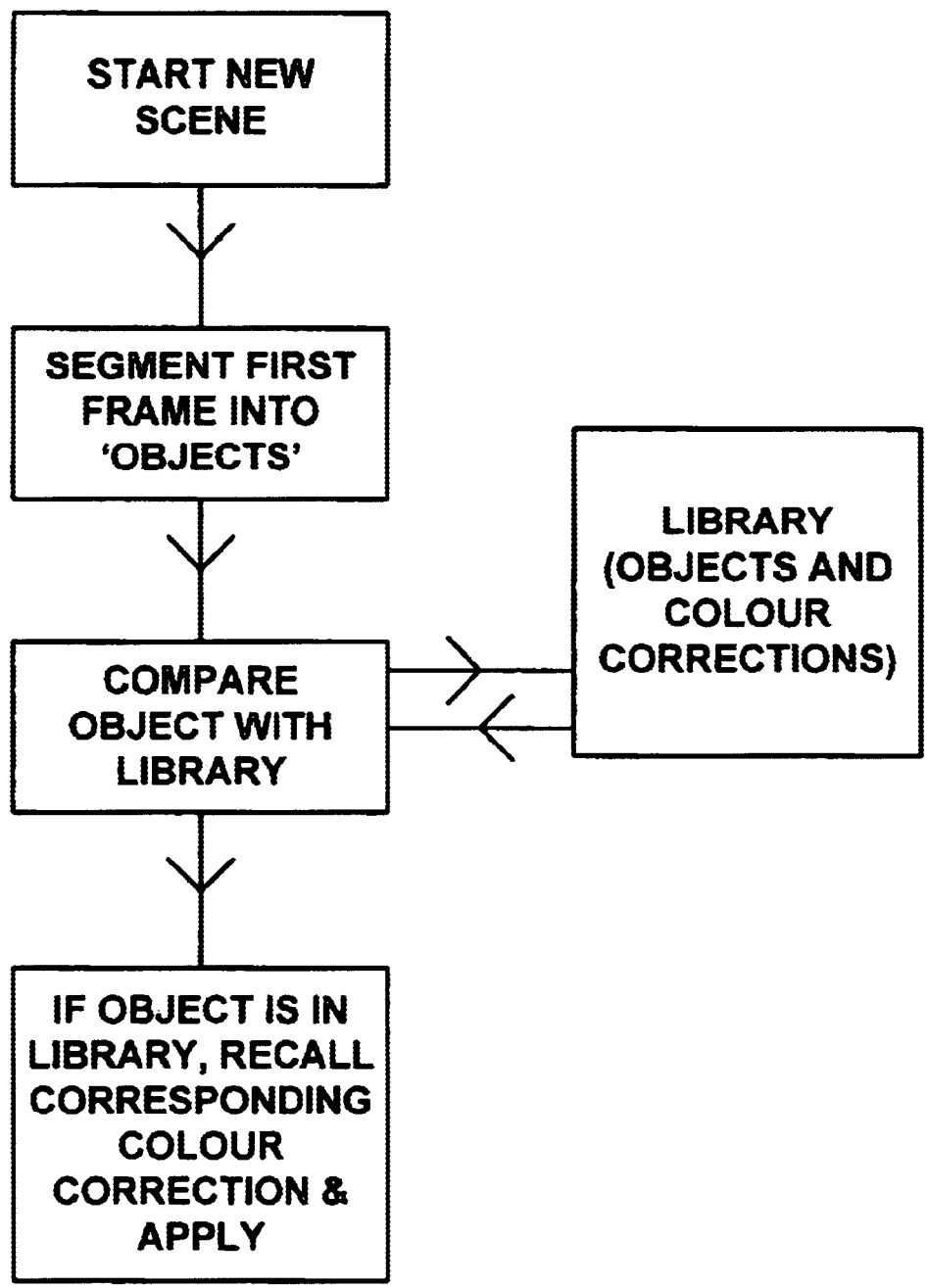
FIG. 1 is a flow diagram showing the process of segmentation of a frame into objects and the comparison of the segmented objects with stored object data.

According to an invention disclosed herein there is provided a method of digitally processing a sequence of video frames, wherein an object is selected in a first frame; digital object data corresponding to the shape of the object is stored on digital data storage means, together with digital modification data corresponding to a desired modification of at least one appearance attribute of the object; the object is identified in a second frame of the sequence by means of the object data; and the appearance attribute of the object in the second frame is modified in accordance with the stored modification data.

Thus, the above invention has the advantage over the system of WO 95/12289 that the appearance attributes of an object may be automatically modified in subsequent frames of a video sequence by reference to the modification data and the shape of the object alone, the modification taking place independently of the position of the object in the frame. Because the object is identified by its shape and not by an approximate, interpolated position or shape, the accuracy of this system is greater than that of, for example, WO 95/12289 in that it will be ensured that only pixels actually comprised within the object are modified.

The object data may further include data corresponding to one or more of the (unmodified) appearance attributes of the object, for example, colour, texture, brightness etc. The appearance attribute may thereby be used as a further parameter to ensure accurate identification of the object.

The modification of the appearance attribute may be a colour correction, for example.

Preferably, the object is identified automatically in each frame in which it appears. There exist well known segmentation algorithms such as are disclosed in "Digital Image Processing" by W. K. Pratt (ISBN 0-471-01888-0) pages 534–547. These algorithms allow a particular frame to be segmented into its constituent shapes. Thus, once any frame has been so segmented the object to be modified can be identified from these shapes and modified in accordance with the stored modification data.

The object may be identified by comparing each of the segmented shapes to the shape defined by the stored object data. In addition, the appearance attributes of each segmented shape may be compared to stored appearance attributes for the object to be modified. Tolerances for the comparison may be used to ensure that minor changes in the appearance of the object do not prevent its identification. These tolerances may be adjustable by an operator.

A plurality of sets of object data may be stored for any one object, each set corresponding to a different view of that object which may occur through the sequence of frames.

The above segmentation and identification process will not always be necessary, for example, in scenes where the object to be modified has not moved position from one frame to the next. It is well known to utilise a 'shot change detector' as part of a telecine system, for example, the shot change detector available from Rank Cintel Ltd, of Ware, England. Such devices work by sampling many lines from every frame of the telecine image, and applying these lines to a very high gain amplifier. The amplifier effectively binarises these lines into 'on' and 'off' portions. These lines are stored for typically five frames. The lines are compared on a cumulative basis, and consecutive frames which differ greatly in the data between the same sampled lines are marked as probable scene change points. There is usually an operator adjustable error margin that can be set to define the difference between frames that constitutes a scene change. Thus these devices can find the start and end points of scenes, which are subsequently used to grade each scene optimally.

By adapting the known shot change detector to register a change at a lower level of difference between two consecutive frames, preferably in addition to registering scene changes at the known high level of change, it is possible for the shot change detector to identify the appearance of a new object in the scene. This may trigger the segmentation algorithm described above to identify the new object. The new object may then be compared to stored object data and, if identified, modified in accordance with the stored modification data.

Thus, according to an invention disclosed herein, there is provided a method of analysing a sequence of video frames wherein a plurality of corresponding lines are sampled from a plurality of consecutive frames of the sequence; the content of the sampled lines is compared for corresponding lines in different frames; a measure of the difference in the content of the corresponding lines is calculated; a first signal is produced if the measure of difference exceeds a first predetermined threshold; and a second signal is produced, in the absence of the first signal, if the measure of difference exceeds a second predetermined threshold, lower than the first threshold.

Advantageously, each video frame may be divided into a plurality of regions, for example two or more tiles. The frames may be split into four equal tiles, each of which may itself be split into four equal tiles. Alternatively, the frame may be split into a different number of tiles. In the case of Standard Definition images, the frame may be split into 4×3 tiles or in the case of High Definition images the frame may be split into 10×6 tiles.

Once each frame has been split into such regions, corresponding regions in subsequent frames may be compared line by line, in the same way as described above. Thus for each region in a frame a measure of difference may be determined for that region compared to the corresponding region in the previous frame. In this way, the ability of the system to determine changes within a scene is improved as the computational complexity associated with determining a change in a selected region between frames is lower than that associated with determining a change in the entire frame.

According to an invention disclosed herein, therefore, there is provided a method of analysing a sequence of video frames, wherein the content of a plurality of corresponding distinct regions of a plurality of consecutive frames is compared; a measure of the difference in the content of corresponding regions in different frames is calculated; and a signal is generated for a region if the measure of difference for that region exceeds a predetermined threshold.

This method is particularly advantageous in detecting the motion of objects in a scene. For example, it can be established according to this method that only two of the regions of a frame have changed since the previous frame. If it had previously been determined that a required object was located in one of these regions in the prior frame, but that object is no longer in that region in the later frame, then rather than attempting to locate the object in all regions of the frame, the other of these regions can be tested first for the presence of the object, as it is likely that the object has moved to this region.

A maximum rate of travel of objects within a scene can be predetermined. For example, it may be determined that a realistic such rate limits the movement of an object from one region only to an adjacent region between consecutive frames. Of course, there is a limit to the speed at which real objects can move and consequently in any given scene there is a limit to the degree of movement of an object that can take place between one or more consecutive frames. In this way, the erroneous identification of a first object as a second object that has moved is prevented if it is determined from the rate information that that second object could not have moved that distance in the relevant number of frames. For example, if a red car moves across a scene from the left to the centre and on the right of the scene a traffic light changes from green to red, it can be determined in the above way that the red of the changing traffic light is not a part of the car that has moved. Using other methods, such an erroneous detection could occur.

Regardless, of the overall number of regions into which the frame is split, a single region will only have a limited number of adjacent regions. For example in the case of square or rectangular tiles, each tile will have only eight neighbouring tiles.

Shot change detection can be used in conjunction with the above method to detect when the whole frame has changed, for example to a different scene, such that it would be pointless to attempt to predict in which of the regions of the new frame an object will occur.

In order to calculate the measure of difference between corresponding regions of different frames a plurality of processing means may be provided each associated with one or more regions of a frame. Thus, the processing means may calculate, in parallel, the measure of difference for respective regions or groups of regions. In this way, the calculation speed is greatly increased. Central processing means may be provided to accumulate and interpret the measures or signals from each processing means. For example, a plurality of hardware units may determine the occurrence of a change in respective tiles of a frame under the control of a software application. A digital signal processing (DSP) chip, such as the Motorola 56300 range and in particular the 56301 chip, may be used as a controller with a reconfigurable field programmable gate array (FPGA) co-processor, such as the Xilinx XC6200 range, as a shot change detector for particular tiles.

In yet a further implementation, the above scene change points (and object entry change points) can be further utilised in grading. Grading is a skilled, time consuming, and therefore expensive process. There have been many attempts to increase the efficiency of the grading process. Indeed, the use of shot change detectors to locate the start and end points is one such known efficiency.

One process that takes time is the setting of the overall 'gain' level of scenes. This is necessary, because different scenes on film may have very different film exposures. It is therefore necessary to adjust the gain level for every scene. It has been tried to have an 'automatic gain' process, where the gain is adjusted automatically, dependant on a parameter such as the overall density of a film frame. However, this method fails because the operator ideally wants a fixed gain throughout most scenes. Methods that change gain dependant on parameters of an individual film frame always produce unacceptable results.

Thus according to an invention disclosed herein there is provided a method of automatically controlling the gain level applied to a sequence of frames transferred from cinematographic film to a digital medium, wherein a plurality of corresponding lines are sampled from a plurality of consecutive frames of the sequence; the content of the sampled lines is compared for corresponding lines in different frames; a measure of the difference in the content of the corresponding lines is calculated; a signal is produced when the measure of difference exceeds a predetermined threshold; the gain level is automatically set on production of the signal; and the set gain level is maintained until a subsequent signal is produced.

Some further illustrative examples will now be described with reference to the figures.

There are many modes of operation of the methods disclosed herein. For example, in one mode, a 'colour object library' may be assembled and stored. In this case, whenever an object in a scene is altered in colour, the shape of that object in all of the frames that it occurs is stored, together with the change of colour that has been applied to that object, in an 'object library'.

Each new scene is segmented into constituent shapes. The derived shapes from the segmentation techniques are compared with the stored 'object library' shapes. Whilst it is not expected that there will be an exact match between shapes, if there is a match error within certain operator definable bounds, it will generally be desirable to apply (with or without confirmation from the operator) the stored colour changes that correspond to the colour object. The logic of this process is illustrated in the flow diagram of FIG. 1.

A particular example of the system working as above is given here to further clarify the process. If we wish to grade a multi-reel film set into video, we may wish to change the colour of a motor car from red, say, to green. Using conventional grading techniques, we will find the first scene in the first reel that contains the car. This scene may contain a red traffic light that is the identical hue to the motor car. We then select the region containing the car. This can be done in many ways, including the methods described in WO 95/12289. One such method may be to draw a rectangular box around the car, in both the first frame of the scene that the car occurs in, and also around the car in the last frame of that scene. Using the techniques described in WO 95/12289, the car is located using the knowledge that firstly it is within the box, and secondly that it has a predefined range of colours (in this case red). Thus we have altered the hue of the car in that scene from red to green. The object shape of the car, and the associated colour change will be stored in the colour object library. Now, assume that the motor car occurs also in the fifth scene of the first reel of film. Being a new scene, the computer controller will apply the segmentation algorithms. Resultant shapes of this fifth scene will be compared with the contents of the colour object library. Because the car, in this fifth scene, is filmed from a different perspective, it may be of a similar but non-identical shape than before. Using shape matching, within the operator predefined error margins together with colour matching, it is possible to correlate that there is a match between the colour of car and shape of car. 'Fuzzy Logic' algorithms may be applied to decide how much error in colour combined with how much error in shape can be allowed before rejecting the 'match'. The colour corrector will apply the relevant colour matching (change red-to-green) to this car. More importantly, this will apply to all scenes on all rolls of the material to be transferred. In this case, it is important to realise that the changes of red to green will not apply to red traffic lights within the scene, as these traffic light are not in the colour object library.

In common with all 'automatic' processes, it is expected that some mistakes will occur. Sometimes objects will be erroneously detected, and sometimes objects will be missed. It is likely that the time spent correcting mistakes that are within these two categories will be small when compared with the time saved by this invention.

In colour grading, it is often normal practice to archive the colour grading data on archival material, in case it is desired to regrade the material at a later date. In this case, it will be desirable to archive the colour object library as part of the data set to be archived.

Figure 2:
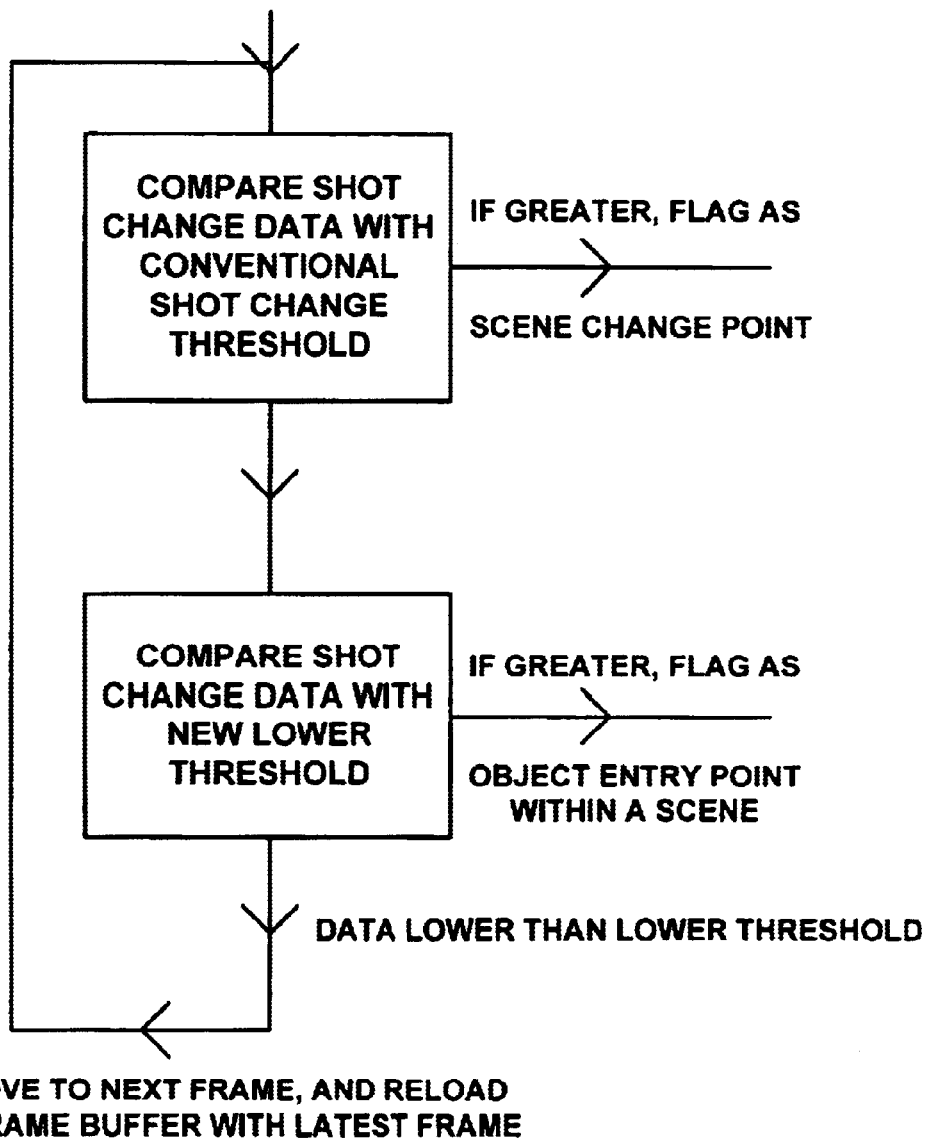
FIG. 2 is a flow diagram showing the operation of a modified shot change detector.

A further improvement to the above system is to utilise a scene change detector in a novel mode, by introducing an additional 'lower' threshold in output from the shot change detector. This additional threshold can be used as another signal to detect an object entering or exiting from a scene. Thus, within a 'scene' in the usual terms, we now have 'sub-scene' marker points. It is worth looking at scenes within these 'sub-scene' points, segmenting the frames, and looking for objects that are already within the colour object library. This extra information makes it less likely for errors to occur. This process is shown in FIG. 2.

These 'sub scene' points are of interest to the operator, and visually or audibly indicated to him. One particular interest of these points is, for example, the 'first' occurrence of the motor car in the earlier example.

It is also possible to utilise the shot change detector to control gain. In a first method, we can utilise the shot change pulse to control an 'auto-gain' system, which determines the required gain for the first frame of a scene. This gain is 'held' until the first frame of the next scene. This method gives the advantage of automatic gain, without the undesirable 'fluctuating' gain that results in other implementations of auto-gain.

A further refinement on the above allows the use of the lower 'sub-scene' change points to drive the autogain-and-hold system. This will allow the gain to be adjusted, for example, where an object, such as a motor car, enters a scene.

It is important to realise that this method may, as all automatic methods inevitable will, have undesirable results. The operator always has control to reject the automatic result, and manually override the gain.

The methods described herein may be carried out using a software system, a hardware system or using a combination of software and hardware. In a particularly preferred arrangement, a hardware system is controlled by a software executing processor.

It will be appreciated that there exist many means and methods which may be employed equivalently to those described herein to achieve the same effects. Such equivalents are intended to be encompassed within the scope of this disclosure.

What is claimed is:

1. A method of digitally processing a sequence of video frames, comprising:

selecting an object in a first frame;

storing, on digital data storage means, digital data corresponding to a shape of the object, together with digital modification data corresponding to a desired modification of at least one appearance attribute of the object;

automatically identifying the object in subsequent frames of the sequence by comparing the stored object data with digital data representing contents of subsequent frames; and modifying the appearance attribute of the object in subsequent frames, in accordance with the stored modification data, wherein a plurality of sets of digital object data representing different possible views of the object in a frame when taken from different directions are stored on the digital storage means, and wherein the object is automatically identified in a subsequent video frame of the sequence by comparing digital image data representing the contents of the subsequent video frame with the stored sets of digital object data.

2. A method as claimed in claim 1, wherein the object is identified in a subsequent frame if a match error between the stored object data and digital data representing an object in the subsequent frame is less than a limiting value which permits identification of the object despite minor changes in its appearance.

3. A method as claimed in claim 2, wherein the limiting value may be altered by an operator.

4. A method as claimed in claim 1, further comprising using an edge detection technique to locate objects in the subsequent frame; and comparing data representing the located objects with the stored digital object data to identify the object.

5. A method of analysing a sequence of video frames, comprising:

comparing content of each digital image element of a plurality of corresponding distinct regions of a first and subsequent frame;

calculating a measure of difference in the content of corresponding regions in the first and subsequent frame.

generating a signal for a region if the measure of difference for that region exceeds a predetermined threshold; and selecting an object to be modified in a first region of the first frame, and using signals generated for the plurality of regions to determine the or each region in which the object is likely to be located in the subsequent frame.

6. A method of automatically controlling the gain level applied to a sequence of frames transferred from cinematographic film to a digital medium, comprising:

sampling the content of each digital image element of a plurality of corresponding lines from a first and subsequent frame of the sequence;

comparing the content of the sampled lines for corresponding lines in different frames;

calculating a measure of the difference in the content of the corresponding lines in the first and subsequent frame;

producing a signal when the measure of difference exceeds a predetermined threshold;

automatically setting the gain level on production of the signal; and maintaining the set gain level until a subsequent signal is produced.

7. The method of claim 6, further comprising:

allowing an operator to manually override the automatically set gain level.

8. A method of automatically controlling the gain level applied to a sequence of frames transferred from cinematographic film to a digital medium, comprising:

sampling the content of each digital image element of a plurality of corresponding lines from a fast and subsequent frame of the sequence;

comparing the content of the sampled lines for corresponding lines in different frames;

calculating a measure of the difference in the content of the corresponding lines in the first and subsequent frame;

producing a first signal when the measure of difference exceeds a first predetermined threshold;

producing a second signal when the measure of difference exceeds a second predetermined threshold lower than the first predetermined threshold;

automatically setting the gain level on production of a signal selected from the group consisting of the first signal and the second signal; and maintaining the set gain level until a subsequent signal is produced.

9. The method of claim 8, further comprising:

allowing an operator to manually override the automatically set gain level.

* * * * *